United States Patent
Schukai et al.

(10) Patent No.: US 11,562,102 B2
(45) Date of Patent: *Jan. 24, 2023

(54) SYSTEMS AND METHODS FOR USE IN SEGREGATING DATA BLOCKS TO DISTRIBUTED STORAGE

(71) Applicant: MASTERCARD INTERNATIONAL INCORPORATED, Purchase, NY (US)

(72) Inventors: Robert Schukai, Marietta, GA (US); Robert Carter, Old Greenwich, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,767

(22) Filed: May 21, 2021

(65) Prior Publication Data

US 2021/0365593 A1 Nov. 25, 2021

Related U.S. Application Data

(63) Continuation-in-part of application No. 16/882,007, filed on May 22, 2020.

(51) Int. Cl.
*G06F 12/00* (2006.01)
*G06F 21/78* (2013.01)
(Continued)

(52) U.S. Cl.
CPC .............. *G06F 21/78* (2013.01); *G06F 21/32* (2013.01); *G06F 21/602* (2013.01); *G06F 21/6245* (2013.01); *H04L 67/1097* (2013.01)

(58) Field of Classification Search
CPC ........ G06F 21/78; G06F 21/32; G06F 21/602; G06F 21/6245; G06F 2221/2107;
(Continued)

(56) References Cited

U.S. PATENT DOCUMENTS

2010/0332530 A1 12/2010 McKelvie et al.
2013/0283125 A1 10/2013 Gladwin et al.
(Continued)

FOREIGN PATENT DOCUMENTS

EP 2792123 B1 9/2017

OTHER PUBLICATIONS

Manjur Kolhar et al., "Cloud Data Auditing Techniques with a Focus on Privacy and Security" IEEE Security & Privacy 15(1):42-51 (Feb. 14, 2017).
(Continued)

*Primary Examiner* — Mardochee Chery
(74) *Attorney, Agent, or Firm* — Harness, Dickey & Pierce, P.L.C.

(57) ABSTRACT

Systems and methods are provided for storing data blocks in distributed storage. One example computer-implemented method includes, in response to receipt of a data block comprising data, generating a value N for the data block, wherein the value N includes a variable integer greater than one and dividing the data block into N segments, wherein each segment includes a portion of the data. The method also includes generating a value M for the data block, wherein the value M includes a variable integer greater than or equal to one, and adding M segments of chaff to the N segments. The method then includes encrypting the N segments and the M segments of chaff and distributing the M segments and the N segments in distributed storage, wherein the N segments and the M segments of chaff are stored in multiple different storage devices included in the distributed storage.

20 Claims, 4 Drawing Sheets

(51) Int. Cl.
  *G06F 21/60* (2013.01)
  *H04L 67/1097* (2022.01)
  *G06F 21/32* (2013.01)
  *G06F 21/62* (2013.01)

(58) Field of Classification Search
  CPC ........ G06F 3/0623; G06F 3/064; G06F 3/067;
  H04L 67/1097
  USPC .......................................................... 713/193
  See application file for complete search history.

(56) References Cited

U.S. PATENT DOCUMENTS

| | | |
|---|---|---|
| 2015/0154074 A1* | 6/2015 | Resch ..................... G06F 16/00 |
| | | 714/764 |
| 2015/0178160 A1 | 6/2015 | Leggette et al. |
| 2018/0315053 A1 | 11/2018 | Schukai et al. |
| 2019/0171835 A1* | 6/2019 | Kumar ..................... H04L 9/085 |
| 2020/0213086 A1* | 7/2020 | Lee ....................... H04L 9/0825 |
| 2021/0365191 A1 | 11/2021 | Schukai |

OTHER PUBLICATIONS

Mohamed Khalil-Hani et al., "Biometric encryption based on a fuzzy vault scheme with a fast chaff generation algorithm" Future Generation Computer Systems 29(3):800-810 (Mar. 2013).

* cited by examiner

SYSTEMS AND METHODS FOR USE IN SEGREGATING DATA BLOCKS TO DISTRIBUTED STORAGE

CROSS-REFERENCE TO RELATED APPLICATION

This application is a continuation-in-part of U.S. patent application Ser. No. 16/882,007 filed May 22, 2020. The entire disclosure of the above application is incorporated herein by reference.

FIELD

The present disclosure is generally directed to systems and methods for use in segregating data blocks to distributed storage and, in particular, to systems and methods for use in segregating the data blocks to and storing the data blocks in different storage devices of such distributed storage based on variables and/or random divisions of the data blocks.

BACKGROUND

This section provides background information related to the present disclosure which is not necessarily prior art.

The exchange and storage of sensitive information or data is known to involve one or more safeguards. Encryption, for example, is known to obscure sensitive data as it is transmitted from a first party to a second party, whereby the first party encrypts the data before sending and the second party decrypts the data upon receipt to reveal the original sensitive data. In addition, other safeguards may be used for stored sensitive data, such as, for example, permissions, network tools or configurations (e.g., firewalls, etc.), etc., to either protect the data as stored or to restrict access to the data where the data is stored.

DRAWINGS

The drawings described herein are for illustrative purposes only of selected embodiments and not all possible implementations, and are not intended to limit the scope of the present disclosure.

Figure 1:
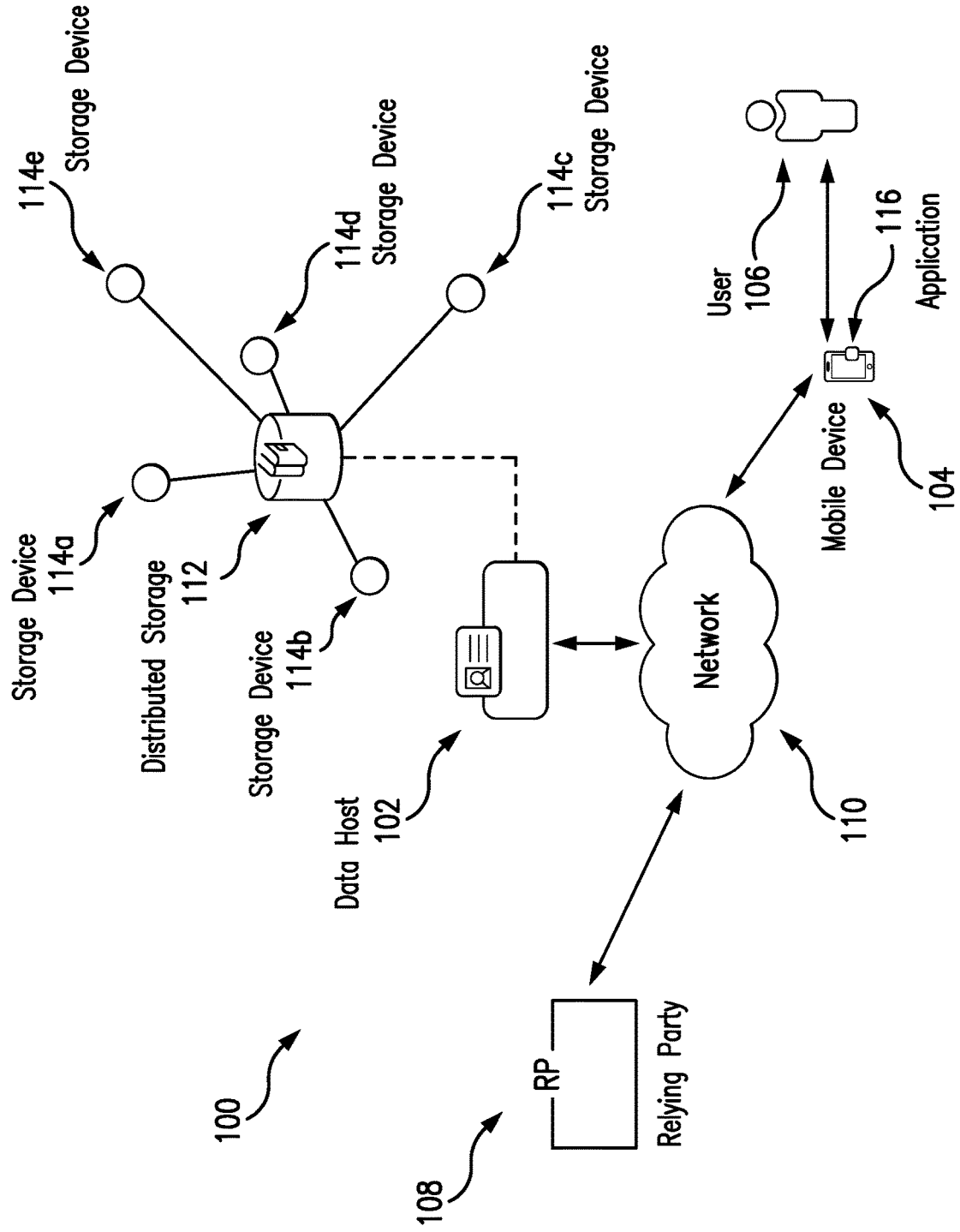
FIG. 1 illustrates an example system of the present disclosure suitable for use in segregating and retrieving data blocks in/from different storage devices of distributed storage.
Figure 3:
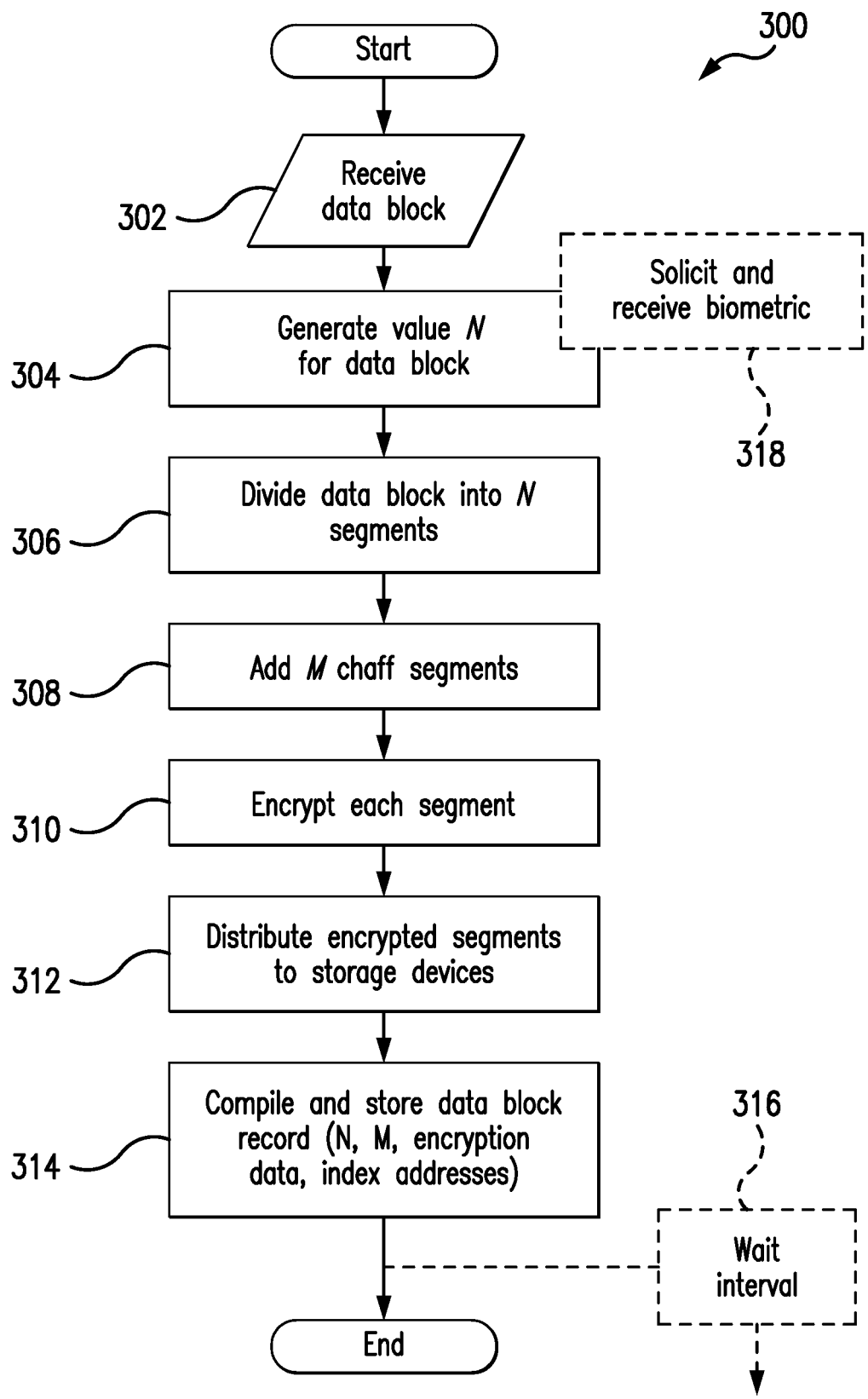
Figure 4:
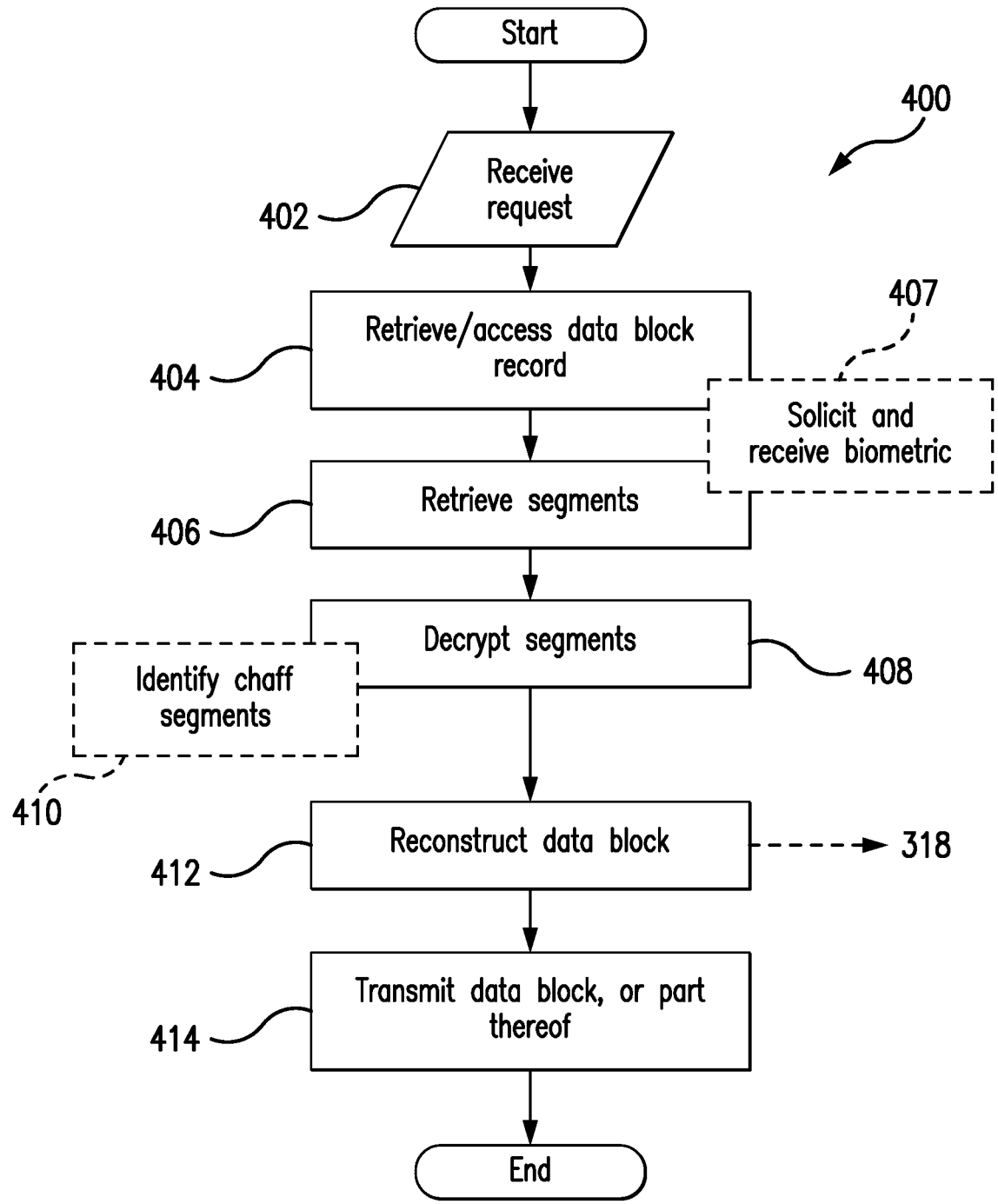

FIG. 3 illustrates an example method, which may be implemented in connection with the system of FIG. 1, for storing a data block in different storage devices of distributed storage, whereby the data block is segregated into segments according to a variable value and further commingled with chaff segments to enhance security of the distributed data segments in connection with storing the segments in the different storage devices; and FIG. 4 illustrates an example method, which may be implemented in connection with the system of FIG. 1, for use in retrieving data segments from different storage devices of distributed storage and reconstructing the data segments into a data block.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Sensitive data may take a variety of different forms. For example, users are often associated with identities, which may include a variety of different information about the users. This information, as such, may be personal identifying information (PII) for the users in that parts of the information, alone or in combination, identify the users to the exclusion of others. Such PII is of particular importance when it is relied on to authenticate the users and/or provide the users with access to activities related to various interactions, including financial interactions (e.g., transferring funds, setting up new accounts, etc.), etc. In connection therewith, the PII is known to different parties, whereby the parties may store the PII (broadly, sensitive data), or a link to the PII, such that there is potential for the PII to be compromised. Apart from PII, specifically, sensitive data may also include transaction data, or data specific to a party (e.g., a company, an agency, a government, a group, a charity, an institution, etc.) rather than specific to a person or individual (e.g., where the data may include a company's financial data, strategic or technical information for a company, bid information, etc.).

Uniquely, the systems and methods herein employ distributed storage to securely store the sensitive data (or information), where the data is segregated in a particular manner. Specifically, a data block containing sensitive data is segregated into a variable number of segments, and then, optionally, a number of chaff segments are commingled with the segregated segments. The segments may then be secured (e.g., encrypted based on a part of the data (e.g., based on a biometric included in the data, etc.), or otherwise) and are then stored across the distributed storage (which may include a mobile device (e.g., a smartphone, a tablet, etc.) of an originator or custodian of the data block, etc.), and a record of reconstruction is stored in a location associated with the originator or custodian of the data block and/or a party associated with the distributed storage. The segments may further be encrypted prior to being stored. Consequently, because the data block is stored in the distributed storage, added security is provided in that a nefarious user in possession of the segments from one or more of the storage devices of the distributed storage (even all of the storage devices) would be unaware of how many segments are needed to reconstruct the original block of data due to the variable number of segments and how many of the segments for a specific data block are real versus chaff segments. These variables provide enhanced protection of the data, for example, including PII, in the possession of a party through the distributed storage, over conventional management/storage techniques. Moreover, the segregated segments may further be combined, and segregated again and distributed, at one or more intervals, to provided still further enhanced security for the sensitive data. In such instances, each of the segments or the subsequent segments may even be secured by a different biometric of the originator or other data (e.g., whereby the biometric or other security of the segments is "rotated, etc.).

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, types of users and relying parties, relationships between users and relying parties, different data hosts (e.g., as services or as custodians, etc.), types of identity services offered, privacy concerns and/or requirements, etc.

The illustrated system 100 generally includes a data host 102, a mobile device 104 associated with a user 106, and a relying party 108, each of which is coupled to network 110. The network 110 may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 110 may include multiple different networks (e.g., private networks, public networks, etc.), where one or more of the multiple different networks are then accessible to particular ones of the data host 102, the mobile device 104, and/or the relying party 108.

The data host 102 in the system 100 generally is associated with segregating and storing data blocks (e.g., associated with user 106, associated with another party or entity, etc.). In this example embodiment, the data blocks generally include personal identifying data (or information) related to the user 106, such as, for example, a name, an address, a phone number, a birthdate, a place of birth, genetics, biometrics (e.g., fingerprints, a facial image, a palm print, a retina image, a voice print/scan, etc.), health data (e.g., medical records, vaccination records, etc.), government identification numbers (e.g., a social security number, a driver's license number, a passport number, etc.), payment account credentials (e.g., payment account numbers, tokens, keys, expiration dates, CVCs, etc.), etc. Broadly, the data blocks include sensitive data. The manner in which the data blocks are stored is described in more detail below. That said, as noted above, the data blocks may contain any different type of sensitive data (i.e., information intended to be secured in one manner or another) in other embodiments, whether specific to a user or to a party, or to multiple users or multiple parties, or even to data in general unrelated to any users or parties, etc. For example, the data block may include, without limitation, transaction data, encryption data, security data and/or protocols, organizational data, access data (e.g., usernames, passwords, entry codes, biometrics, etc.), political data, voting data, planning data, bid data, contract data, etc.

As shown in FIG. 1, the data host 102 includes distributed storage 112, which in turn includes (as indicated by the solid lines) multiple discrete storage devices 114a-e. Each of the storage devices 114a-e includes one or more solid state storage devices, optical storage devices, magnetic storage devices, virtual storage devices, combinations thereof, etc. That said, the storage devices 114a-e may each be generally understood as a separate node of a single physical storage network, or a node of a physically separated storage network, etc. For instance, the storage devices 114a-e may be logically separated using different virtual machines located on common hardware. In particular, for example, a single hard drive could be partitioned to include the different storage devices 114a-e configured to run different operating systems, whereby the storage devices 114a-e may live on different virtual machines yet still running on the same hardware. Alternatively, each of the storage devices 114a-e may reside on a completely separate physical machine. Here, the different physical machines may operate together in the same rack space within a facility of the data host 102 (or other party), or the machines may be geographically separated (e.g., into different data centers in different states, cities, regions, etc.). This physical separation may be utilized when building geographically redundant solutions where operations will run in multiple regions/multiple zones. As an example, a storage device (e.g., one of storage devices 114a-e, etc.) (e.g., a hard drive, etc.) may be disposed in a data center on the west coast of the United States and operate as part of the distributed storage, while a different storage device (e.g., another one of storage devices 114a-e, etc.) may be disposed in the United Kingdom and still another storage device (e.g., still another one of storage devices 114a-e, etc.) may be disposed in Australia (with each operating as part of the distributed storage 112).

It should be appreciated that while five storage devices 114a-e are included in the example distributed storage 112 of the system 100, any suitable number of storage devices (e.g., three, ten, twelve, twenty, thirty, fifty, one hundred, three hundred, etc.) may be included in the other distributed storage embodiments depending on, for example, size and scope of the distributed storage 112 and/or size and/or type of data blocks, etc.

The mobile device 104 in the system 100 is associated with the user 106. In general, the mobile device 104 is configured to participate in the origination of data (or information) to be stored in the distributed storage 112, or the request for retrieval of the information in connection with a relying party (e.g., the relying party 108, etc.). The mobile device 104 may include, without limitation, a mobile device, a smartphone, laptop, personal computer, server, etc., which may be specific to the user 106 or generally accessible to the user 106. While the mobile device 104 is illustrated as separate from the distributed storage 112 in FIG. 1, it should be appreciated that in other embodiments the mobile device 104 may form part of the distributed storage 112, as indicated by the dotted line in FIG. 1. That is, the mobile device 104 may be configured as described herein, and additionally, or alternatively, be configured consistent with one of the storage devices 114a-e of the distributed storage 112 (e.g., as storage device 114c as illustrated in FIG. 1, etc.).

The relying party 108 is a party that expects or intends to receive and/or rely on information included in the data blocks and/or related to the user 106 in connection with at least one interaction with the user 106. The relying party 108 may include, for example, a banking institution, which is configured to rely on PII for the user 106 to open an account (e.g., a credit account, a debit account, a savings account, etc.), or potentially to move funds into or out of an account previously issued by the banking institution to the user 106, etc. As other examples, the relying party 108 may include a corporation, an organization, a healthcare provider, a government agency (e.g., a revenue or tax agency, etc.), or a retailer offering products (e.g., good, services, etc.) to the user 106, etc., whereby each relies, in one way or another, on the sensitive data (e.g., PII associated with the user 106, etc.), etc. In still other examples, the relying party 108 may include other different parties associated with stored data for the user 106 (either related to the user 106 or to the party (e.g., for consumption by the user 106, etc.), etc.). For example, the relying party 108 may include a telecommunication service to which the mobile device 104 is associated (e.g., a network member or subscriber, etc.), whereby the relying party 108 is configured to maintain a backup of data included in the mobile device 104 (i.e., sensitive information, etc.). That said, it should be appreciated that the user 106 may be an individual or a party (e.g., a company, an agency, a government, a group, a charity, an institution, etc.) and the relying party 108 may be any party interacting with the user 106 on the basis of sensitive data stored in the distributed storage 112, as described in more detail below.

For purposes of illustration herein, and with no intention to limit the scope of the present disclosure, in the illustrated embodiment the relying party 108 includes a digital wallet provider (e.g., a banking institution or payment facilitator (e.g., a P2P facilitator, a P2B facilitator, etc.), etc.), which provides a bank-type or wallet-type application 116 for use by the user 106. As shown in FIG. 1, the application 116 is installed and included in the mobile device 104. Upon accessing the application 116, the application 116 configures the mobile device 104 to invite the user 106 to register with the relying party 108. The registration will often include the providing of personal identifying information, or broadly, sensitive information, about or related to the user 106 (or other associated users) to the relying party 108.

In connection therewith, it should be appreciated that the user 106 is associated with an identity. For purposes of illustration, Table 1 below includes specific examples of sensitive data, which is PII for the user 106, for example, as part of his/her identity, etc. The PII included in Table 1 is merely example in nature, as other different or other additional data may be included, and generally is, in the identity of the user 106. As part of registration of the user 106, the mobile device 104, as configured by the application 116, solicits the information/data from the user 106. The user 106, in turn, enters or otherwise provides the data/information to the mobile device 104. Upon receipt, then, the mobile device 104 is configured, by the application 116, to transmit the information to the relying party 108.

TABLE 1

| User 106 | |
| --- | --- |
| Name | Jane Smith |
| Mailing Address | 123 Main St., New York, NY 10038 |
| Phone Number | 123-456-7890 |
| Birthdate | Jan. 1, 1980 |
| Birth Place | New York, NY |
| Government ID # | 123456789 |
| Username | JSmith |
| Password | Password123456 |
| Biometric | Fingerprint |

In connection with the registration, the application 116 may configure the mobile device 104 to solicit one or more biometrics from the user 106, for use in securing and/or accessing the sensitive data at a later time. The biometric(s) may include different fingerprints, facial images, voice recordings, etc. The mobile device 104 may be configured to then provide the biometric(s), or template(s) associated therewith, to the relying party 108, along with the PII (if not already included).

Upon receipt of the information/data from the mobile device 104, the relying party 108 is configured to submit the information (and, potentially, the biometrics) to the data host 102 in order for the data to be stored (e.g., via the network 110, etc.).

In turn, the data host 102 is configured to receive the data and to define a data block for the user 106, which is associated with a unique ID for the user 106 (or the data block) (or multiple data blocks). The unique ID may include a phone number for the mobile device 104 or a biometric for the user 106, for example, or a different aspect of the PII for the user 106, or the unique ID may include a series of numbers and/or letter, etc., which is not directly indicative of the PII of the user 106 (e.g., a variably and/or randomly selected unique ID, etc.). The unique ID may be defined by the relying party 108 (and provided with the PII), or it may be defined by the data host 102 after receipt of the PII, etc. As for the data block, the information provided by the user 106 (via the relying party 108) (or portions thereof) forms the data block (or multiple data blocks). The format of the data block may vary, for example, based on the particular system embodiment. In this example embodiment, the data block for the above PII of the user 106 is presented below in Table 2, as text content to be stored by the data host 102 in the distributed storage 112. The data block is shown in Table 2, then, where the text content includes all the PII from Table 1 in a defined sequence (e.g., first name, last name, street number, street name, street type, city, state, etc.) in plain text, with different information parts separated with a period (or dot). Again, it should be appreciated that the data block shown in Table 2 is example in nature, and that various other forms (or formats) of data blocks may be used in other examples and within the scope of the present disclosure.

TABLE 2

| Data Block | jane.smith.123.main.st.new.york.ny.010038.1234567-890.jan.1.1980.new.york.ny.123456789.JSmith.Password123456.[numeric representation of biometric]. |
| --- | --- |

In some embodiments, the data host 102 may interact with the user 106, for example, via the application 116, etc., to solicit a biometric from user 106. In turn, the user 106 may provide the biometric to the data host 102 (again, via the application 116 and/or the mobile device 104 as configured by the application 116, etc.), whereby the biometric may be used as the unique ID to be associated with the data block(s) for the user's data (e.g., PII, etc.). In connection therewith, in some such embodiments, the data host 102 may solicit the biometric from the user 106 randomly so as to create an element of unpredictability around generation and/or unlocking of the data in the data block(s).

Next, the data host 102 is configured to segregate and store the data block in the distributed storage 112. In particular, in this example embodiment, the data host 102 is configured to generate a variable value N for the data block. The value N is an integer value greater than one, and may include, for example, 2, 3, 4, 6, 25, or another suitable number. The value N may be generated in any suitable manner, for example, pursuant to one or more algorithms, whereby the value may be randomly or pseudo-randomly generated, or even predictably generated (e.g., a last digit of a street address plus five, etc.), etc. That said, the value N may generally be "variable" between different generations, per data block, whereby the division of the data block may vary between different data blocks (whether including the same type and/or volume of data, or not). Additionally, the number N may be greater than or less than the total number storage devices 114*a*-*e* (where the mobile device 104 may be included as a storage device in such determination) or otherwise related thereto, for example, based on geographic location(s) of the storage devices 114*a*-*e* (e.g., where segments of a data block may be limited to ones of the storage devices 114*a*-*e* within a region of the mobile device 104 and/or the data host 102, etc.). The data host 102 is configured to then divide or segregate or split the data block into N segments. The data block may be divided consistent with, for example, a Shamir secret sharing scheme or other suitable sharing scheme, where N is the number of segments or fragments into which the data block is divided. In this way, rather than a single storage device holding all of the data for the data block, the data block is divided into the N pieces amongst multiple storage devices, such that no one storage device holds the entire data block (and whereby each storage device holding one of the N divided pieces of the data block contributes their piece in order to recreate the data block (e.g., the N pieces (or some determined threshold less than N (e.g., a threshold defined as K, etc. which is less than N; etc.)) are then needed to reconstruct the data block, etc.)).

Moreover, the data host 102 is configured to add M chaff segments (where M is an integer value greater than or equal to one) to the segregated segments of the data block (i.e., as actual segments). The value M, like the value N, may be a variable (e.g., random, pseudo-random, predictable, etc.), but also, in one or more embodiments, may be fixed. The chaff segments generally include chaff, which is not data included in the data block, but rather fake or bogus information, whereby the actual segments are commingled with the chaff segments (comprising the chaff) to provide a total number of segments (M+N). The chaff data may or may not be consistent with the type of data included in the data block (e.g., name, street or email address information (e.g., kate.yorker.dr.bob@email.com, etc.) in the data block of Table 2, etc.), whereby consistent data (including the chaff) may maintain the appearance of belonging to the data block, etc.

The segments may then be encrypted, using one or more suitable encryption techniques. In connection therewith, the segments may be encrypted based on a biometric (e.g., a fingerprint, a facial image, etc.) specific to the user 106, other PII of the user 106, the unique ID for the user 106 and/or the mobile device 104, or other suitable data related and/or unrelated to the user 106, etc.

The data host 102 is configured to next distribute the segments (i.e., encrypted actual and chaff segments) to the various storage devices 114a-e of the distributed storage 112. As shown in FIG. 1, and as indicated by the dotted line, the mobile device 104 may be included as (or may represent) one of the storage devices 114a-e (e.g., the storage device 114c in the illustrated system 100, etc.). The encrypted segments may be evenly spread over the storage devices 114a-e, or otherwise distributed among the storage devices 114a-e. In connection therewith, the data host 102 is configured to compile a data block record for the data block. The record includes, without limitation, a description or identifier of the data block (or the user 106 associated with the data block), a biometric associated with the user 106 (or an identifier of the biometric (e.g., right index finger, etc.), etc.), and/or an identifier of the mobile device 104, and also, the value N (i.e., the number of segments into which the data block was divided), the value M (i.e., the number of chaff segments), the index address for each of the locations to which the segments were stored (i.e., a designation of a storage device and a specific address within that storage device), and instructions for reconstructing the data block (e.g., the order of the actual segments, decryption techniques (e.g., using the identified biometric, etc.), the biometric authentication scheme (e.g., at the mobile device 104, etc.), etc.), etc.

The data host 102 may be then configured to store the data block record in memory (e.g., memory 204 described below, etc.) and/or to transmit a confirmation of the storage of the data block (along with the unique ID) to the relying party 108. Alternatively, the data host 102 may be configured to return the data block record along with the unique ID to the relying party 108 or to the mobile device 104, which in turn, is configured to store the data block record in association with the unique ID for later use to reconstruct the data block. When the data block record is stored in the mobile device 104, for example, it should be appreciated that the application 116 may configure the mobile device 104 to protect the data block record with one or more forms of authentication (e.g., a biometric of the user 106, etc.), etc.

That said, it should be appreciated that the data host 102, the mobile device 104, and relying party 108 may share different roles in the storage of the data block. The data host 102 may be configured to perform the operations above and then store the data block record, or alternatively, the mobile device 104 or the relying party 108 may be configured to perform many of the operations above, with the data host 102 merely configured as a conduit for the mobile device 104 or the relying party 108 to access the distributed storage 112 (and, in particular, ones of the storage devices 114a-e). For example, the mobile device 104 may be configured to cooperate with the data host 102, as described above, to store the sensitive data (which may then be accessible as described below), etc. It should be appreciated that the division of the operations between the data host 102, the mobile device 104, and the relying party 108 may be implementation specific and vary from the description above and below.

Later, when the relying party 108 requires the information included in the data block (e.g., the user 106 requests a transaction via the application 116, etc.), in one implementation (where the data block record is maintained by the data host 102), the relying party 108 is configured to provide a request for the data block to the data host 102, where the request includes the unique ID. The data host 102, in turn, is configured to retrieve the data block record associated with the unique ID from memory and to retrieve each segment identified in the data block record from the storage devices 114a-e of the distributed storage 112 (one of which, again, which may include the mobile device 104, etc.). For example, the data host 102 may be configured to solicit the data block record, or a data segment thereof, from the user 106 at the mobile device 104. In turn, the mobile device 104 may be configured to authenticate the user 106 based on a biometric, or otherwise, before returning the data block record or data segment. Alternatively, the mobile device 104 may be configured to solicit a biometric (e.g., as defined in the data block record, etc.) from the user 106 and to return the data segment identified in the data block along with the biometric to the data host 102.

The data host 102 is further configured to then decrypt the data segments (based on encryption data included in the data block record (e.g., a unique ID, a biometric of the user 106, etc.)), to discard the chaff segments, and to reconstruct or reassemble the data block. The data host 102 may be configured to then return the data block to the relying party 108 in total, or potentially, to respond with only information identified or requested by the relying party 108 in the request.

In another implementation (where the data block record is maintained by the relying party 108), the relying party 108 is configured to access the data block record and to request the segments from the data host 102 based on the index addresses included in the data block record. The data host 102, in turn, is configured to access the segments, based on the index addresses (e.g., at one of the storage devices 114a-e and/or the mobile device 104, etc.), and to return the segments to the relying party 108. As noted above, it should be appreciated that less than all the segments may be required to reconstruct the data block in some embodiments (e.g., a threshold number K of the segments less than a total number N of the segments generated, etc.), whereby the data host 102 may be configured to return only a required number of segments (e.g., the threshold number K of the segments, etc.) to the relying party 108. In various embodiment, specifically, a segment included in the mobile device 104 (e.g., when acting as storage device 114*c*, etc.) may be constructed and/or defined in a manner required to reconstruct the data block, whereby in this implementation or the implementation above, the data host 102 may be configured to retrieve that segment from the mobile device 104 (and certain other segments) and to return the segment(s) to the relying party 108. In this manner, the mobile device 104 is necessarily involved in the reconstruction (e.g., whereby authentication of the user 106 at the mobile device 104 may be required (e.g., by the application 116, etc.) to return the segment to the relying party 108 and to thereby reconstruct the data block record (e.g., thereby providing still further enhanced security, etc.), etc.).

In addition to the data segments, the relying party 108 and/or the data host 102 may also be configured to solicit a biometric from the user 106, via the mobile device 104, for use in decryption and/or reconstruction. The mobile device 104, in turn, is configured to solicit (e.g., a specific biometric indicated in the data block record, etc.) and capture the biometric from the user 106, and then provide the biometric to the relying party 108 and/or the data host 102. In connection therewith, the relying party 108 and/or the data host 102 may solicit the biometric from the user 106 randomly so as to create an element of unpredictability around unlocking of the data in the data block(s).

Upon receipt of the segments, the relying party 108 is configured to then decrypt the data segments (based on encryption data included in the data block record (e.g., the unique ID, a biometric, etc.)), to discard the chaff segments, and to reconstruct or reassemble the data block. Additionally, the mobile device 104 likewise may be configured, by the application 116, for example, to reconstruct the data block and transmit the same, or part thereof, to the relying party 108, etc.

Then, with the information either from the data host 102 or as reconstructed, the relying party 108 (or mobile device 104) may proceed as appropriate. For example, the relying party 108 may be configured to initiate a fund transfer from the user 106 to another user identified, via the application 116, based on a payment account or other information identified in the data block, after the user 106 is authenticated based on data included in the mobile device 104 and/or based on further information from the data block. Moreover, regardless of how the relying party 108 proceeds, generally, when the need for the data is over, the data host 102 and/or the relying party 108 that reconstructed the data is configured to delete the reconstructed data, to thereby maintain the distributed storage of the data block in the distributed storage 112, but not elsewhere.

In yet another implementation, the user 106 may coordinate retrieving the data, for modification and/or for redistributing the data. For example, the data host 102 and/or the mobile device 104 may be configured, after a defined interval (e.g., a day, a week, 15 days, a month, etc.) and/or after a user input, to redistribute the data block. In particular, the data host 102 (or mobile device 104) may be configured to retrieve the data block record, to retrieve the data segments from the distributed storage 112, and to reconstruct the data block record, as described above (but, generally, without the relying party 108). The data host 102 may then be configured to solicit a biometric or other data from the user 106 (e.g., via the mobile device 104, etc.) and to repeat the above operations to segregate, encrypt (based on the biometric or other data) and distribute the data block, whereby the segments may be different from a prior segregation, the data block record may be different, etc., thereby providing enhanced security by rotating segments and/or records in the distributed storage 112.

It should be appreciated that the data host 102 may be configured to solicit a different biometric from the user 106, upon which the data block is encrypted and/or secured in such modification or redistribution of the data. For example, the data host 102 may be configured to rely on a fingerprint of the right index finger to encrypt the segments of the data block in a first instance, and then to rely on a fingerprint of the left index finger (or a facial image) to encrypt the segments of the same data block in a second instance after the first instance. In this manner, the biometric being used to secure the data block is rotated, to gain, provide, etc. enhanced security. Further, the data host 102 may solicit the different biometric from the user 106 randomly so as to create an element of unpredictability around unlocking of the data in the data block(s).

While the above illustration is provided with reference to the PII of the user 106, again, the systems and methods herein may be applied to virtually any type of data for storage in the distributed storage 112. For example, it should be appreciated that the data block may include any different data either associated with the user 106 or multiple users or not. For example, the data block may include transaction data representative of dozens or hundreds of payment account transactions for the user 106. The transaction data, therefore, is specific to the user 106. In another example, the data block may include transaction data for all transactions to a specific merchant, or for a specific interval, or for a specific region, whereby the transaction data is representative of payment account transactions by multiple various different users consistent with the constraints of the data block. The data block may include still other data in other system embodiments. That said, in general, the data block will often include information (or data) of a sensitive nature, whereby the enhanced security described herein is appropriate for the storage of the information (e.g., where a policy indicates the information should be protected, etc.). Accordingly, the data block may include, without limitation (as suggested above), financial information, employment information, bid information, genetic information, health data, username information, password information, login or access information, biometric information, and/or other identity-specific or identity-generic information, etc.

While only one data host 102, one mobile device 104, one user 106 and one relying party 108 are illustrated in the system 100, it should be appreciated that additional ones of these parties/parts may be included in other system embodiments. Specifically, for example, it should be appreciated that other system embodiments may include multiple other users (e.g., individuals or parties, etc.) and various different relying parties, etc.

Figure 2:
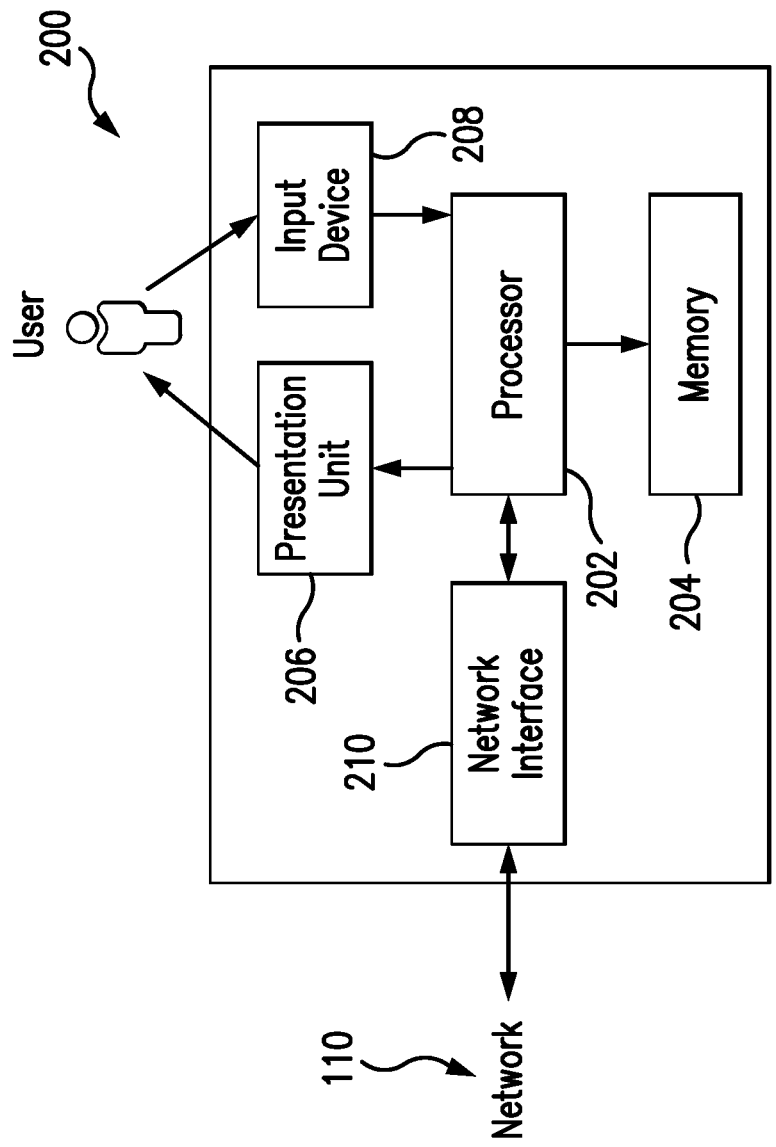
FIG. 2 is a block diagram of a computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, or any other suitable physical or virtual machine, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the data host 102, the mobile device 104, and the relying party 108 may be considered, may include, and/or may be implemented in at least one computing device consistent with the computing device 200, coupled to (and in communication with) the network 110. The distributed storage 112 and/or one or more of the storage devices 114a-e may also be considered, may include, and/or may be implemented in at least one computing device consistent with the computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, data (as a data block or segment (either encrypted or not)), index addresses, variable and/or random values, encryption/decryption keys, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of methods 300-400, etc.), whereby upon such performance the computing device 200 may be transformed (by instructions causing the performance) into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., prompts to the user 106 at the mobile device 104 to accept a request to share data, etc.), etc. And, various interfaces (e.g., forms to request or respond to a request for data, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, submissions of requests to stored or share data, etc., in response to prompts from one or more interfaces, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks herein (e.g., network 110, etc.) and/or with other devices described herein. Further, in some example embodiments, the computing device 200 may include the processor 202 and one or more network interfaces incorporated into or with the processor 202.

FIG. 3 illustrates an example method 300 for use in segregating data blocks into storage devices of a distributed storage. The example method 300 is described as implemented in the system 100, and in particular, the data host 102 and distributed storage 112 thereof, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

Initially in the method 300, at 302, the data host 102 receives a data block for the user 106 (via the relying party 108, the user 106 (e.g., via the application 116 and/or the mobile device 104, etc.), or otherwise) for storage in the distributed storage 112 (e.g., with an instruction to store the data block and/or corresponding data, etc.). The data block, in this example, includes the data block included in Table 2 (i.e., mailing address, phone number, birthdate, birth place, government ID #, username, password, biometric, etc.), which is received in connection with registering or updating the user 106 with the relying party 108, via the application 116. That said, the data block may be otherwise in other embodiments. For example, the data block may include more or less PII than illustrated in Table 2, or a different type of data, such as, for example, a table of transaction data, or other financial data (or medical data or organization data, for example) having dozens or hundreds or more or less columns, and thousands or hundreds of thousands or more or less rows, etc. In short, the format and size of the data block may be specific to a particular implementation of the method 300. It should be appreciated, therefore, that the data host 102 may receive the data block in a variety of different manners (e.g., via an API call, email, application operation, file sharing, etc.), including, via a manner whereby the instruction to store the data is expressed or implicit with receipt of the data (or otherwise), etc. In connection therewith, the transfer and instruction may come, for example, from the mobile device 104 (or via a computing device 200 associated with the relying party 108 or via another computing device 200), as entered and/or input by the user 106 (or user associated with the relying party 108 (or automatically in connection with the application 116 or otherwise) or other party which is the source or custodian of the data, etc.).

It should be appreciated that the data host 102 may modify the data block prior to proceeding below. For example, the data host 102 may remove data from the data block, or not, for example, the biometric, for use in the steps described below and/or to conform to a specific implementation and/or privacy standard, rule, or regulation, etc. It should be further appreciated that along with the data block, the data host 102 may separately receive the biometric or other data for the specific purpose of securing the data block. For example, the user 106 may provide (e.g., via the mobile device 104, to the data host 102, or via the relying party 108, etc.) a left thumbprint to secure the data block, etc.

Upon receipt of the data block (and, potentially, the biometric), in this example embodiment, the data host 102 associates the data block, and/or the user 106, with a unique ID. As described above, the unique ID may include a phone number for the mobile device 104 of the user 106, or a different aspect of the PII for the user 106. Or, the unique ID may include a series of numbers and/or letters, etc., which is not directly indicative of the PII of the user 106 (e.g., a variably and/or randomly selected unique ID, etc.) (e.g., a data host account ID specific to the user 106, etc.). Further, the unique ID may be defined by the data host 102 (as part of associating the unique ID with the data block), or the unique ID may be defined by the relying party 108 and provided to the data host 102 with the PII (whereby the data host 102 then associates the unique ID with the data block).

Thereafter, the data host 102 generates, at 304, a value N (broadly, a variable value) for the data block (i.e., the value N may be "variable" between different executions of this operation, per data block, whereby the division of the data block may vary between different data blocks). The value N may be generated by any suitable variable number generator or random number generator (e.g., whereby the number varies (whether predictably or not) for different data blocks received, etc.).

It should be appreciated that the term "random number generator" and "random number" should be understood to include a pseudo-random number generator and a pseudo random number, whereby the value N may be generated, for example, by a linear congruential generator. That said, other suitable techniques may be employed to generate the value N. Moreover, it should be appreciated that the random number generator, when used, may limit the value N based on a size of the data block (e.g., as defined by a size range expected and/or intended per segment (e.g., segregate into no less than X bytes or greater than Y bytes per segment, etc.), etc.) and/or a number of the storage devices 114a-e included in the distributed storage 112 (e.g., as defined by a range of segments per storage device (e.g., at least one, but no more than ten, etc.), etc.) (e.g., including or excluding the mobile device 104, etc.), etc. Specifically, for example, it may not be efficient to divide the data block of Table 2 into one hundred segments, whereby a size of the data block of Table 2 may instead bind the random number generator to a value N between three and seven, for example. Likewise, a minimum for the value N may also be employed to ensure sufficient division of the data block whereby no more than one, two, or three parts of PII are included in the same segment, and also potentially that at least one segment is designated for the mobile device 104 (when acting as storage device 114c, for example), etc.

That said, in generating the value N, the data host 102 may take into account whether physical or geographical separation is being used to store individual segments of the data block (e.g., whether the storage devices 114a-e are physically or geographically separated, etc.).

For example, in instances where the storage devices 114a-e are geographically separated (e.g., where segments of the data block are stored in Sydney, Australia, in London, Great Britain, and in New York City, N.Y., and where the segments are reconstructed in San Francisco, Calif.; etc.), such that overall system latency to reconstruct the segments may cause notable wait times for the user 106, the data host 102 may generate a generally smaller value for N (e.g., a value of less than ten, a value of less than seven, a value of three, etc.). Further, the data host 102 may also (or alternatively) rely on performance of the network 110 (e.g., the Internet, etc.) in determining the value N, for instance, where distance between locations of the storage devices 114a-e may factor into the time it takes to reconstruct the segments of the data block (e.g., where further distances between the storage devices 114a-e result in inconsistent performance of the network 110, the data host 102 may generate a generally smaller value for N; etc.). This may be further impacted by the importance or velocity of access of the data (e.g., highly accessed data blocks may be segregated to fewer storage devices (i.e., local devices) as compared to less accessed data blocks, etc.). Alternatively (or additionally) in the above instances, the data host 102 may define a threshold number K as the number of segments required to reconstruct the data block, and where the value K is less than the value N. In doing so, then, only the K number segments are required to be retrieved in order to reconstruct the data block thereby impacting the above considerations relating to reconstruction (e.g., latency, geographic separation, etc.). Conversely, the data host 102 may generate a larger value for N in instances where the storage devices 114a-e are logically separated at a common location (e.g., where the storage devices 114a-e are hosted in different virtual machines on the same hardware, etc.) or where the storage devices 114a-e are physical separated but in the same equipment rack, since overall reconstruction latency due to geographic dispersal is limited as compared to geographically dispersed storage devices.

With continued reference to the method 300, with the value N, the data host 102 divides, at 306, the data block into the N segments. Specifically, in one example, the data host 102 employs the Shamir secret sharing technique to divide the data block (or the secret) into the N number of segments (for example, based on N as the input). Then, in the Shamir secret sharing technique, to reconstruct the data block, K segments (e.g., at least K segments, etc.) (broadly, a threshold) out of the N number of segments are required (e.g., where K is less than N, where K equals N, etc.) (where K is potentially another input into the Shamir secret sharing technique), whereby if only K−1 segments are available, the data block cannot be reconstructed (i.e., the secret will not be revealed). In one implementation, the K segments may then provide for reconstruction of the data block despite one or more of the storage devices 114a-e of the distributed storage 112 (including the mobile device 104) being unavailable. It should be appreciated, however, that different techniques may be employed to segregate the data block consistent with the value N. What's more, the segments may be consistent segments of the data block (e.g., equal or substantially equal segments, etc.), or not. In general, the size of the segments will be dependent on the technique(s) employed for segregating the data block, the data included in the data block (e.g., the type of data, the size of data, etc.), and/or the data block itself (e.g., the format of the data block, etc.).

In some embodiments, the data host 102 may require that a particular one (or more) of the segments of the data block be retrieved, in connection with reconstructing the data block. This may be based on the particular unique ID for the segment(s) and/or this may be based on the particular storage device(s) in which the segment(s) is/are maintained (e.g., as a rule associated with reconstruction, etc.). For instance, in the above example, in dividing the data block into the N segments, the data host 102 may set a rule that requires retrieval of any segment stored in the mobile device 104 (where the mobile device acts as a storage device for the segments, etc.) (e.g., where one of the K segments must include a segment retrieved from the mobile device 104, etc.). Conversely, the data host 102 may set a rule that a segment stored in the mobile device 104 may be used for reconstruction but is not required for reconstruction (e.g., if the mobile device is not available, is lost, or is damaged, etc.).

What's more, the particular rule set by the data host 102 may be based on the type of data included in the data block (e.g., apply the rule when the data block includes information relating to the user's passport, etc.), a preference of the user 106, a preference of the relying party 108, etc. Further in the above example, the data host 102 may also (or alternatively) impose a rule upon dividing the data block into the N segments requiring a particular one or more of the segments be stored in a particular one or more of the storage devices 114*a-e* (e.g., in mobile device 104 operating as a storage device, etc.). Such a rule, again, may be based on the type of data included in the data block, a preference of the user 106, a preference of the relying party 108, etc. In connection therewith, the rule may then further require that the particular one or more of the segments be retrieved in connection with reconstructing the data block.

With that in mind, the data host 102 may employ, for example, the Shamir secret sharing technique to divide the data block from Table 2 into four segments, which together provide all the PII included in the data block. The resulting four segments are illustrated in Table 3 (resulting, in this example, in a (4, 4) secret consisting of the four segments shown in Table 3 (and such that the secret requires all four of the segments to come back together to recreate the data block)).

TABLE 3

| Segment.1 | jane.smith.123.main.st.new.york. |
| Segment.2 | ny.010038.1234567890.jan.1.1980. |
| Segment.3 | new.york.ny.123456789.JSmith. |
| Segment.4 | Password123456.[numeric representation of biometric]. |

Next, the data host 102 determines a number M of chaff segments and then adds (or commingles), at 308, the M chaff segments to the divided segments. The value M may be any integer greater than or equal to one. The value M may be a fixed number of segments, or it may be a variable number (e.g., a random or a pseudo-random number, etc.). The number M may be, like above, a randomly generated value, or it may be a next number generated by a suitable technique (e.g., predictable, etc.), etc. Often, the value M will be less than the value N, to limit encryption/decryption processes associated with the chaff segments while balancing security and efficiency of the distributed storage of the data block (e.g., a number of processes involved in division and reconstruction, etc.). That said, in some embodiments, the value M may be greater than the value N, depending, again, on a particular implementation, efficiency or security.

It should be appreciated that in at least one embodiment, the chaff segments may be omitted and not commingled with and/or added to the actual segments.

At 310, the data host 102 encrypts each of the segments, both actual and chaff. The data host 102 may employ any number of different encryption techniques to encrypt the segments. Specifically, for example, the data host 102 may encrypt the segments via various encryption or hashing standards/techniques, such as MD5, a SHA family standard/technique (e.g., such as described in FIPS Pub 180-4—https://nvlpubs.nist.gov/nistpubs/FIPS/NIST.FIPS.180-4.pdf, etc.), Rivest-Shamir_Adleman (RSA), public key infrastructure (PKI), certificates, signatures, a non-standard or proprietary encryption/hashing technique (e.g., a proprietary algorithm such as the Cisco-proprietary hashing algorithm, the TrustStamp Evergreen hash, etc.), etc. In addition, the data host 102 may encrypt the segments based on the specific received biometric of the user 106 (e.g., from the data block, etc.) (e.g., the left thumbprint from above, etc.), or the unique ID applied to the data block, or other suitable information, etc. It should be appreciated that the data host 102 may employ the same encryption for the actual and chaff segments, or may apply a different encryption for the actual segments versus the chaff segments (e.g., to facilitate identification of chaff segments later, etc.). That said, in one or more embodiments, the encryption may be omitted, whereby the segments (actual and chaff) are stored as unencrypted information.

Table 4 illustrates the segments from Table 3, plus three chaff segments. As show, the segments are provided in text form, and also in encrypted form.

TABLE 4

| Segment.1 | jane.smith.123.main.st.new.york. | [encrypted value] |
| Chaff.1 | bill.doe.543.second.ave. | [encrypted value] |
| Chaff.2 | las.angeles.fla.98765.6543212345. | [encrypted value] |
| Segment.2 | ny.010038.1234567890.jan.1.1980. | [encrypted value] |
| Segment.3 | new.york.ny.123456789.JSmith. | [encrypted value] |
| Segment.4 | Password123456.[numeric representation of biometric]. | [encrypted value] |
| Chaff.3 | JDoe.passcode985432. | [encrypted value] |

With continued reference to FIG. 3, the data host 102 then distributes, at 312, the encrypted segments (e.g., the encrypted value for each of the segments, etc.) to the individual storage devices 114*a-e* of the distributed storage 112 (e.g., including, potentially, the mobile device 104, etc.). In particular, the encrypted segments, along with a segment name (e.g., Segment.3, etc.) for each of the segments, is provided to the storage devices 114*a-e* and stored therein at a particular address, which is either known to the data host 102, or provided back to the data host 102 from the particular storage device. The particular address of each of the storage devices 114*a-e* of the distributed storage 112 is denoted by an index address. In connection therewith, the segments may be distributed at the storage devices 114*a-e* randomly or in accordance with a particular assignment. What's more, at the storage devices 114*a-e*, the segments may then be distributed to any type of location that can host essentially a table record using standard write/read techniques (e.g., an Oracle database, MongoDB, Excel, custom record base, etc.). And, as described above, the segments may reside at the storage devices 114*a-e* where the storage devices 114*a-e* are each either at logically separated locations, physically separated locations, or a combination thereof, as described above.

In connection with the above, either before, during and/or after distributing the encrypted segments, the data host 102 further compiles and stores, at 314, a data block record for the data block (e.g., in memory of the data host 102, in the distributed storage 112, the mobile device 104, etc.). The record includes, without limitation, the value N, the value M, encryption data, and index addresses for the encrypted segments. The encryption data may include an encryption or decryption key (e.g., the unique ID, the user's biometric, etc.), or other data relevant to the particular encryption technique employed at 310. The index addresses include the specific addresses to which each of the segments was distributed. For example, the index address may include a name of the storage device 114*c*, and a specific address or pointer within the storage device 114*c* (e.g., st_device114*c*, R2C1 (row 2, column 1), etc.). In addition, the record further includes instructions for reassembling the data block. Specifically, for example, the instructions may include an ordering of the different segments, based on a segment name applied to the segment, and an identification of the actual segments versus the chaff segments, etc. Or, the instructions may include an ordering based on a storage device location of the segment.

The data block record is stored, by the data host 102, in memory of the data host 102 (e.g., the memory 204, etc.) (or in the distributed storage 112, or in the mobile device 104, etc.) in association with the unique ID. That said, the data block record may be stored in the mobile device 104, in other examples. Once stored, as shown in FIG. 3, the method 300 generally ends (subject to a wait interval at step 316, as described in more detail below). Moreover, it should be appreciated that the data block record may also be stored at the relying party 108 in one or more embodiments. In general, the data block record will often be stored by the party (e.g., the relying party 108, the mobile device 104, etc.) (in association with a unique ID) which is anticipated to reconstruct the data block for later requests to thereby avoid transmitting the data block record to/from computing devices and/or entities for reasons related to security. In at least one embodiment, the data block record is stored away from the mobile device 104, to thereby permit reconstruction of the data block independent of the mobile device 104 (e.g., in scenarios where the mobile device 104 may be lost or otherwise unavailable, etc.).

FIG. 4 illustrates an example method 400 for use in retrieving data blocks in distributed storage. The example method 400 is described as implemented in system 100 and with additional reference to the computing device 200. However, the methods herein again should not be understood to be limited to the system 100 or the computing device 200, as the methods may be implemented in other systems and/or computing devices. Likewise, the systems and the computing devices herein should not be understood to be limited to the example method 400.

With the data block stored in the distributed storage 112 (as described in method 300), the relying party 108 or the user 106 may require access to the data block (e.g., to initiate a fund transfer or perform another action, etc.). In connection therewith, either via the application 116 or the relying party 108, a request to access the data block is generated and provided to the data host 102, directly or via the relying party 108. The request includes the unique ID associated with the data block (or the user 106), and may further include a biometric of the user 106 (e.g., as solicited by the mobile device 104 and captured by the mobile device 104, etc.).

At 402, the data host 102 receives the request to access the data block for the user 106. The data host 102 then retrieves or accesses, at 404, the data block record associated with the unique ID for the user 106 (as provided in the request) (e.g., from memory of the data host 102, the mobile device 104, the distributed storage 112, etc.). As explained above, the data block record includes the index addresses for all the segments associated with the data block (i.e., actual segments and chaff segments). The data host 102 then retrieves the segments (or a required threshold number of segments, etc.) from the storage devices 114*a-e* of the distributed storage 112 as indicated by the index addresses, at 406.

It should be appreciated that, in some embodiments, retrieving less than all the segments (i.e., a required threshold number of segments) may be advantageous when a segment is included in the mobile device 104 and the mobile device 104 is not available.

When the request to access the data block does not include a biometric for the user 106, in some embodiments, the data host 102 may optionally (as indicated by the dotted box in FIG. 4) solicit, at 407, a biometric from the user 106 (e.g., via the mobile device 104, etc.). The biometric may be the specific biometric used to secure the data block (e.g., the left thumbprint above, etc.). In general, the data host 102 solicits the biometric from the user 106, at the mobile device 104 (e.g., via the application 116 or otherwise, etc.). The solicitation may include a description of the biometric (e.g., "Please provide your left thumbprint?" etc.). The mobile device 104 then receives the biometric from the user 106 and provides the same to the data host 102 (whereby the data host 102 then also receives the biometric, at 407).

The data host 102 then follows the instructions included in the data block record to reconstruct the data block (e.g., the order of the segments provided in the record, the order of storage devices provided in the record at which the segments are stored, etc. to thereby produce or reconstruct the data block of Table 2; etc.). In particular, the data host decrypts, at 408, the retrieved segments (e.g., based on the received biometric, the unique ID, etc.). In one example, the segment names of the actual and chaff segments may be appended to the data segment prior to encryption in method 300, whereby the names of the segments (e.g., Segment.3, etc.) are revealed for the actual segments through decryption, while the names of the chaff segments may also be revealed (e.g., Chaff.1, etc.), or not. In another example, the actual segments may be encrypted consistent with one technique, while the chaff segments may be encrypted with a different technique. As such, in decrypting the segments, the data host decrypts, at 408, all of the segments consistent with the technique used to encrypt the actual segments. In doing so, the data host 102 decrypts the actual segments into the data included in the data block, while the chaff segment is decrypted into non-data, whereby the actual segments are differentiated from the chaff segment (such that any of the segments not decrypted or not properly decrypted would be considered chaff).

As should be appreciated then, the data host 102 may identify, at 410, the chaff segment(s) through the decryption of the segments, as indicated by the dotted box in FIG. 4. When the decryption, however, is not used to identify the chaff segment(s), the data host 102 may separately identify the chaff segment(s), if any, based on the data block record and then discard the chaff segment(s). For instance, the chaff segment(s) may be identified as chaff segments in the data block record or an indication of such may be stored in the storage devices 114a-e (e.g., in a table therein, etc.) with the chaff segments. That said, in the above example, following such decryption of the actual segments and the chaff segments (at 408) and identification of the chaff segments (at 410), the data host may discard the chaff segments (Chaff.1, Chaff.2, and Chaff.3) as shown in Table 5. The remaining actual segments than include Segment.1, Segment.2, Segment.3, and Segment.4.

TABLE 5

| Segment.1 | jane.smith.123.main.st.new.york. | [encrypted value] |
| Chaff.1 | bill.doe.543.second.ave. | [encrypted value] |
| Chaff.2 | las.angeles.fla.98765.65432l2345. | [encrypted value] |
| Segment.2 | ny.010038.1234567890.jan.1.1980. | [encrypted value] |
| Segment.3 | new.york.ny.123456789.JSmith. | [encrypted value] |
| Segment.4 | Password123456.[numeric representation of biometric]. | [encrypted value] |
| Chaff.3 | JDoe.passcode985432 | [encrypted value] |

With the decrypted actual segments, and the chaff segments(s) discarded, the data host 102 reconstructs the data block, at 412, consistent with the instructions included in the data block record. The data host 102 then transmits, at 414, the data block, or part thereof, to the relying party 108 and/or the mobile device 104. It should be appreciated, for example, that the request, received at 402, may identified specific information requested (e.g., a government ID, password, etc.), whereby the data host 102 transmits just the information requested and not the entire data block.

For instance, with reference to Table 6, the instructions in the data block record for reconstructing the data block may include an order in which the segments are to be reconstructed to achieve the data block (e.g., Segment.1, Segment.2, Segment.3, and Segment.4; etc.). Or, as noted above, the instructions may include an order of the storage devices at which the segments were stored (e.g., the instructions may be based on the locations at which the segments were stored, etc.), whereby the resulting segments are then reconstructed in the order of the storage devices from which they are retrieved. In either case, from the instructions, the data block is reconstructed such that the reconstructed data block in Table 6 matches the original data block in Table 2.

TABLE 6

| Instructions | Segment.1; Segment.2; Segment.3; Segment.4 |
| Data Block | jane.smith.123.main.st.new.york.ny.010038.1234567-890.jan.1.1980.new.york.ny.123456789.JSmith.Password123456.[numeric representation of biometric |

While FIG. 4 is described in terms of the data host 102 reconstructing the data block, it should be appreciated that the data block may be reconstructed by the relying party 108, in possession of the data block record. The relying party 108 would perform the same steps, as described above, with reference to method 400, with the retrieval step 406, for example, being via the data host 102. What's more, it should be appreciated that in one or more embodiments, the mobile device 104 may be employed to store the data block record and then reconstruct the data block, via the application 116, for example, when required.

Referring again to FIG. 3, the method 300 includes the step 316, at which the data host 102 waits for an interval. The interval may include, for example, a day, or a week, or a month, or other suitable interval, etc. Generally, after the data block has been segregated and stored, the user 106 or the data host 102 may opt to reconstruct the data block and re-segregate the data block based on potentially different data (e.g., a different biometric of the user 106, etc.). As such, after the wait interval of 316 in method 300, the method proceeds to method 400, and in particular, step 404. The data host 102 proceeds to retrieve the segments and to reconstruct the data block as described above (at steps 404-412). Then, in this scenario, the method 400 proceeds, optionally, as indicated by the dotted line, to step 318 of method 300. At 318, the data host 102 solicits and receives a biometric from the user 106 (e.g., via the mobile device 104, etc.). The biometric may be different from a prior biometric (e.g., a right index fingerprint, as compared to the left thumbprint; etc.). That said, it should be appreciated that data other than a biometric (e.g., a phone number, a code (including letters, digits, or both), a phrase, a random number, an image, etc.) may be solicited and used by the data host 102 as described below.

Upon receipt of the biometric (or other data), the data host 102 proceeds to step 304 of method 300 to segregate the data block, to encrypt the data segments with the biometric (or other data) and to store the data block, again, in the distributed storage 112. In connection therewith, the data segments are encrypted with the new biometric (or other data) as described above. In this manner, the data host 102 is permitted to rotate the biometric (or other data) used to secure the data block from time to time, thereby providing enhanced security to the storage of the data block in the distributed storage 112.

By way of example, the systems and methods herein may be used by electronic commerce (E-commerce) merchants to securely protect user data stored for the purposes of making future payments (e.g., payment card information and shipping information, etc.). Similarly, the systems and methods herein may enable financial institutions (e.g., banks, etc.) or others to protect personal data that they are obligated to store for regulatory compliance (e.g., in connection with the Fair Credit Reporting Act, etc.). Further, the relying party 108 herein may involve a digital identity ecosystem, whereby the relying party 108 stores or manages identity data on behalf of the user 106 (and other users), for sharing with other relying parties (e.g., merchants, financial institutions, marketplaces, travel/hospitality entities, healthcare providers, etc.) at time of account creation, with user consent, etc.

In view of the above, the systems and methods herein provide for enhanced security and distribution of data blocks in storage devices of a distributed storage. In connection therewith, the systems and methods herein introduce a hash from a central location that is injected into a secret sharing map, which defines variably and/or randomly how many segments a data block (e.g., a secret, etc.) should be broken into plus a record locator for decrypting, and also introduces the addition of a randomizer that injects additional segments that are bogus in content but serve to further scatter the actual segments of the data block. The data block record maintains a knowledge of how many bogus pieces have been inserted into the distribution coupled with the number of pieces the secret has actually been broken into. As such, the data block record provides a strong key for unlocking the data block (e.g., the secret, etc.) when needed. What's more, the systems and methods herein provide for at least one segment of a data block to be included in (or stored in) a mobile device of a user (associated with the data in the data block). In doing so, though, the systems and methods herein may allow for use of less than all generated segments to be used to reconstruct the data block (e.g., a threshold number of segments that is less than the total number of segments originally generated, etc.). In this manner, the mobile device may be relied on for distributed storage of the at least one segment of the data block but may not be required for reconstruction of the data block (e.g., where the mobile device is not available, is lost, is unresponsive, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, by a computing device, a data block comprising data; (b) generating, by the computing device, a value N for the data block, wherein the value N includes a variable integer greater than one (i.e., the value N is "variable" between different executions of the instant step, per data block, whereby the division of the data block varies between different data blocks); (c) dividing, by the computing device, the data block into N segments, each segment including a portion of the data; (d) encrypting, by the computing device, the N segments; (e) distributing, by the computing device, the N segments in a distributed storage, wherein the N segments are stored in multiple different storage devices included in the distributed storage; (f) generating, by the computing device, a value M for the data block, wherein the value M includes a variable integer greater than or equal to one; (g) adding, by the computing device, M segments of chaff to the N segments; (h) encrypting, by the computing device, the M segments of chaff; (i) distributing, by the computing device, the M segments in the distributed storage along with the N segments, wherein the N segments and the M segments of chaff are stored in the multiple different storage devices included in the distributed storage; (j) compiling, by the computing device, a record for the data block, the recording including the value N, the value M, encryption data for the N segments and the M segments of chaff, and index addresses for the storage devices of the distributed storage in which the N segments and the M segments of chaff are stored; (k) receiving, by the computing device, a request for the data included in the data block; (l) retrieving, by the computing device, the N segments and the M segments of chaff from the storage devices of the distributes storage; (m) reconstructing the data block based on the record for the data block, thereby providing access to the data included in the data block; and (n) after retrieving the N segments and the M segments of chaff, discarding the M segments of chaff based on the record for the data block.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in storing data blocks in distributed storage, the method comprising:
   receiving, by a computing device, a data block comprising data including identifying information for a user;
   generating, by the computing device, a value N for the data block, wherein the value N includes a variable integer greater than one;
   dividing, by the computing device, the data block into N segments, each segment including a portion of the data;
   adding, by the computing device, M segments of chaff to the N segments, wherein the value M includes a variable integer greater than or equal to one and wherein said chaff is not part of the data block;
   encrypting, by the computing device, the N segments and the M segments of chaff, based on biometric data of the user; and
   distributing, by the computing device, the encrypted N segments and the encrypted M segments in a distributed storage.

2. The computer-implemented method of claim 1, further comprising generating, by the computing device, a value of M for the data block.

3. The computer-implemented method of claim 1, wherein the N segments are encrypted by a first encryption technique and the M segments of chaff are encrypted by a second encryption technique, the first encryption technique different than the second encryption technique.

4. The computer-implemented method of claim 1, wherein the N segments and the M segments of chaff are each stored in different storage devices included in the distributed storage.

5. The computer-implemented method of claim 4, further comprising compiling, by the computing device, a record for the data block, the record including the value N, the value M, the biometric data, and index addresses for the storage devices of the distributed storage in which the N segments and the M segments of chaff are stored.

6. The computer-implemented method of claim 5, further comprising:
   receiving, by the computing device, a request for the data included in the data block;
   retrieving, by the computing device, the N segments and the M segments of chaff from the storage devices of the distributes storage;
   decrypting the N segments and the M segments of chaff; and
   reconstructing the data block based on the record for the data block, thereby providing access to the data included in the data block.

7. The computer-implemented method of claim 6, further comprising:
   soliciting second biometric data from the user at a mobile device associated with the user;
   receiving the second biometric data from the user;
   after retrieving the N segments and the M segments of chaff, discarding the M segments of chaff based on the record for the data block; and
   wherein decrypting the N segments and the M segments of chaff includes decrypting the N segments and the M segments of chaff based on the received second biometric data; and
   wherein reconstructing the data block incudes reconstructing the data block from the N segments.

8. The computer-implemented method of claim 4, wherein the data of the data block includes the biometric data of the user; and
   wherein a mobile device of the user is included in the distributed storage as one of the different storage devices.

9. The computer-implemented method of claim 4, wherein the different storage devices are each geographically separated in the distributed storage.

10. The computer-implemented method of claim 4, wherein at least two of the different storage devices are geographically located at a same location and are logically separated in the distributed storage at said same location.

11. The computer-implemented method of claim 1, wherein the value N is one of a randomly generated value and a pseudo-randomly generated value.

12. A system for use in storing data blocks in distributed storage, the system comprising:
   distributed storage including multiple different storage devices each configured to store segments of data; and
   a data host computing device coupled in communication to the distributed storage, the data host computing device configured to:
   receive a data block comprising data including identifying information for a user;
   generate a value N for the data block, wherein the value N includes a variable integer greater than one;
   divide the data block into N segments, each segment including a portion of the data;
   add M segments of chaff to the N segments, wherein the value M includes a variable integer greater than or equal to one and wherein said chaff is not part of the data block;
   encrypt the N segments and the M segments of chaff based on biometric data specific to the user; and
   distribute the encrypted N segments and the encrypted M segments of chaff in the distributed storage, wherein the N segments are stored in the multiple different storage devices included in the distributed storage.

13. The system of claim 12, wherein the multiple different storage devices are each geographically separated in the distributed storage;
   wherein one of the multiple different storage devices includes a mobile device of a user associated with the data included in the data block.

14. The system of claim 12, wherein at least two of the multiple different storage devices are geographically located at a same location and are logically separated in the distributed storage at said same location.

15. The system of claim 12, wherein the data host computing device is further configured to compile a record for the data block, the record including the value N, the value M, the biometric data, and index addresses for the different storage devices of the distributed storage in which the N segments and the M segments of chaff are stored.

16. The system of claim 15, wherein the data host computing device is further configured to:
   receive a request for the data included in the data block;
   retrieve the N segments and the M segments of chaff from the different storage devices of the distributes storage;
   decrypt the N segments and the M segments of chaff, based on the biometric data included in the record;
   discard the M segments of chaff based on the record for the data block; and reconstruct the data block from the N segments based on the record for the data block, thereby providing access to the data included in the data block.

17. The system of claim 12, wherein the data host computing device is further configured to:
receive a request for the data included in the data block;
retrieve the N segments and the M segments of chaff from the distributes storage;
receive second biometric data specific to the user;
decrypt the N segments and the M segments of chaff, based on the second biometric data;
discard the M segments of chaff based on a record for the data block; and
reconstruct the data block from the N segments.

18. The system of claim 17, wherein the data host computing device is further configured to solicit the second biometric data, through an application at a mobile device of the user; and
wherein the data host computing device is configured, in order to receive the second biometric data, to receive the second biometric data from the mobile device of the user.

19. A non-transitory computer-readable storage medium including executable instructions for storing data blocks in distributed storage, which when executed by at least one processor, cause the at least one processor to:
in response to receipt of a data block comprising data associated with a user, generate a value N for the data block, wherein the value N includes a variable integer greater than one;
receive a first biometric associated with the user;
divide the data block into N segments, wherein each segment includes a portion of the data;
generate a value M for the data block, wherein the value M includes a variable integer greater than or equal to one;
add M segments of chaff to the N segments, wherein said chaff is not part of the data block;
encrypt the N segments and the M segments of chaff with the received first biometric; and
distribute the M segments and the N segments of chaff in a distributed storage in communication with the at least one processor, wherein the N segments and the M segments of chaff are stored in multiple different storage devices included in the distributed storage.

20. The non-transitory computer-readable storage medium of claim 19, wherein the executable instructions, when executed by the at least one processor, further cause the at least one processor to compile a record for the data block, the record including: the value N, the value M, encryption data for the N segments and the M segments of chaff, and an index addresses for the different storage devices of the distributed storage in which the N segments and the M segments of chaff are stored; and
wherein the executable instructions, when executed by the at least one processor, further cause the at least one processor to, after distributing the M segments and the N segments in the distributed storage:
receive a request for the data included in the data block;
receive a second biometric for the user;
retrieve the N segments and the M segments of chaff from the different storage devices of the distributes storage;
decrypt the N segments and the M segments of chaff with the received second biometric;
discard the M segments of chaff based on the record for the data block; and
reconstruct the data block from the N segments based on the record for the data block, thereby providing access to the data included in the data block.

* * * * *